INVENTOR.
ROBERT C. SANTOSUOSSO

ATTORNEYS

United States Patent Office 3,550,305
Patented Dec. 29, 1970

3,550,305
FISHING DEVICE
Robert C. Santosuosso, 42 Sterling St.,
Malden, Mass. 02148
Filed May 26, 1969, Ser. No. 827,574
Int. Cl. A01k 91/00
U.S. Cl. 43—42.74        3 Claims

ABSTRACT OF THE DISCLOSURE

A T-shaped leader line spreader of rigid construction is provided with trapped ball swivels mounted at the ends and center thereof. Leader lines are attached to the ball swivels at opposite ends of the T cross-piece and a sinker may be attached to a center swivel at the base of the leg.

BACKGROUND OF THE INVENTION

(1) Field of the invention

This invention relates generally to fishing devices and more particularly is directed towards a new and improved spreader for attaching multiple leaders and hooks to a single line without entanglement.

(2) History of the prior arts

Various types of spreaders for fishing tackle have been available for many years. Generally, these devices have been rather complicated mechanically, structurally weak and not entirely effective for the intended task of maintaining leader lines disentangled from one another. It is therefore an object of the present invention to provide improvements in leader spreaders for use with fishing tackle and more particularly to provide a simple, low-cost and rugged spreader for maintaining leader lines well apart from one another to avoid entanglement.

SUMMARY OF THE INVENTION

This invention features a spreader for use with fishing tackle, comprised of a rigid T-shaped body, the leg end of which is adapted to be connected to a line for casting while leader lines are attached to the outer ends of the cross-piece. Means are provided for attaching a weight to the center section of the T to provide a balanced condition of the device when in use. Ball swivels are provided at each connecting point to provide maximum freedom of movement at points of connection while maintaining a rigid T bar construction.

DETAILED DESCRIPTION OF THE PREFERRED EMBODIMENT

Figure 1:
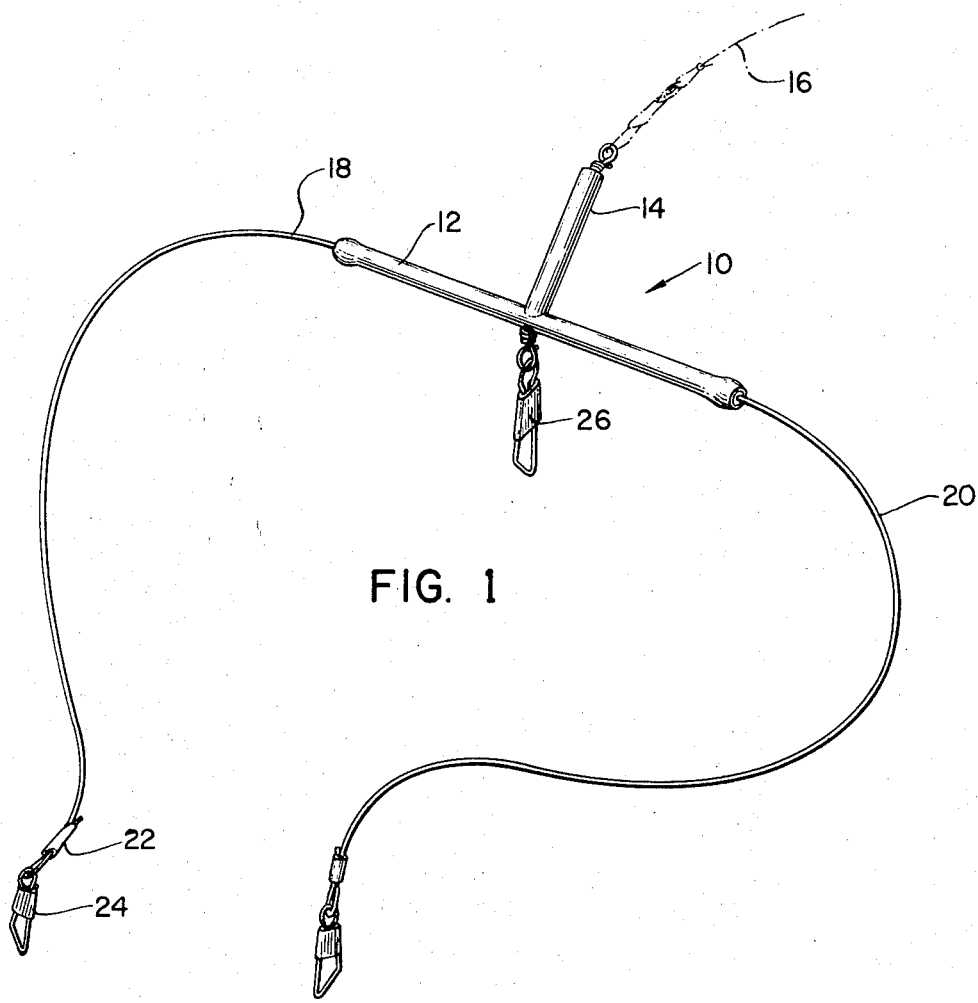
FIG. 1 is a view in perspective of a leader spreader made according to the invention, and,
FIG. 2 is a sectional view in side elevation thereof.

In the drawings reference character 10 generally indicates a T-shaped spreader bar comprised of a rigid cross-piece 12 and a right angular leg 14 fixed to the center portion thereof. The spreader preferably is of tubular construction and fabricated from a suitable material such as copper which provides both casting weight and strength to the rig. Other materials such as plastic, aluminum or the like may also be employed to advantage. The outer end of the leg 14 is intended to be connected to a fishing line 16 while the outer ends of the cross-piece 12 are connected to leaders 18 and 20. In practice, it is desirable that the leaders 18 and 20 be of a strong, durable and flexible material and for this purpose it has been found that plastic-coated wire provides very satisfactory results since leaders of this material do not easily wrap around one another and have a greater tendency to straighten themselves than do conventional line or leader material. At the end of each leader a loop is formed and closed by a clamp 22 and a spring clip 24 is attached thereto for use in attaching hooks, plugs or the like to each leader. A similar spring clip 26 is attached to the mid-portion of the cross-piece 12 for adding sinkers or other hooks and plugs to the rig.

Figure 2:
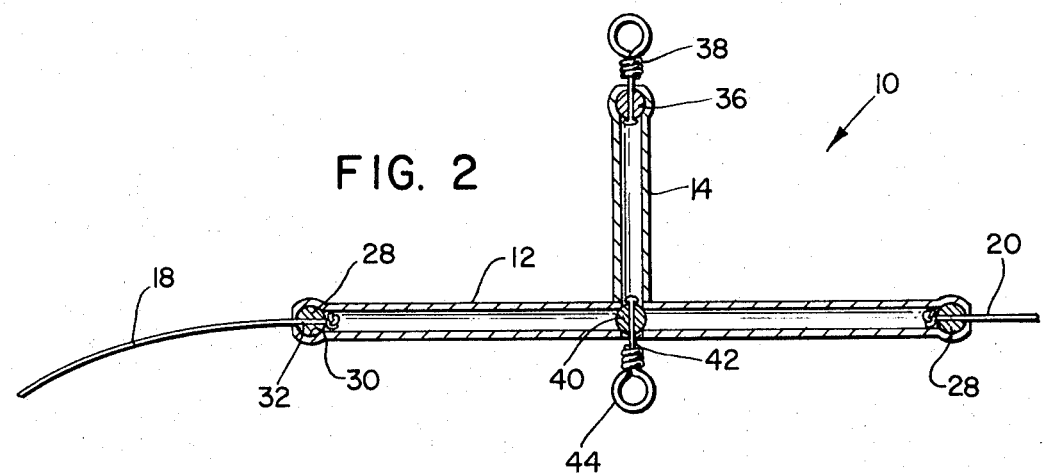

As best shown in FIG. 2 the leaders 18 and 20 extend straight out from the end of the cross-piece 12 so that the leaders project in opposite directions so as to minimize the chance of entanglement with one another. The leaders are secured to the spreader 10 each by means of a spherical element 28 trapped in a cooperating semi-spherical seat 30 formed at each end of the cross-piece 12. The spherical element 28 is formed with a diametrical passage 32 to which the leader 18 is passed and knotted at its free end so as to secure the leader to the spherical element. The element 28 is free to rotate within its semi-spherical socket 30 to provide a swivel connection between the leader 18 and the spreader. This arrangement permits the leader to be moved about more or less freely without the leader undergoing chafing which might tend to cut the leader and the spreader.

As shown in FIG. 2, the outer ends of the cross-piece 12 are turned inwardly so as to close partially the open tubing, thus trapping the element 28 securely to the piece.

At the upper end of the leg 14 another spherical element 36 is provided and mounted in the same fashion as the element 28. In this instance the element 36 is provided with a wire loop 38 to which the line 16 is attached. Here again the ball element 36 provides a swivel connection which enhances the freedom of movement of the rig.

Another spherical element 40 is mounted in the center of the cross-piece 12 at the base of the leg 14. The cross-piece 12 is formed with a central opening 42 in register with the element 40 and through which extends the shank of a wire loop 44 to which the spring clip 26 is attached.

Having thus described the invention what I claim and desire to obtain by Letters Patent of the United States is:

1. A fishing device, comprising:
 (a) a T-shaped unitary body of rigid construction having a cross-piece and a leg extending right angularly from the center thereof,
 (b) the ends of said cross-piece and said leg each being formed with sockets,
 (c) a spherical element rotatably mounted in each of said sockets and restrained against displacement therefrom,
 (d) each of said elements being formed with a diametrical passage,
 (e) a leader extending through the passage of each element in the cross-piece and secured thereto,
 (f) line securing means extending through the passage of the leg element and secured thereto.
2. A fishing device according to claim 1 including another spherical element rotatably mounted in said cross-piece at the base of said leg, said cross-piece being formed with an opening in register with said other spherical element and connecting means attached to said other spherical element.
3. A fishing device according to claim 1 wherein the passages of the elements in said cross-piece are generally co-axial with one another.

References Cited
UNITED STATES PATENTS
2,592,741   4/1952   Ristine _____ 43—42.74
2,766,547   10/1956  Gallagher _____ 43—42.74

WARNER H. CAMP, Primary Examiner